United States Patent [19]

Jacquelin

[11] 4,038,458
[45] July 26, 1977

[54] ZINC-AIR ELECTROCHEMICAL CELL

[75] Inventor: Jean Jacquelin, Marolles en Hurepoix, France

[73] Assignee: Compagnie Generale d'Electricite S.A., Paris Cedex, France

[21] Appl. No.: 648,233

[22] Filed: Jan. 12, 1976

[30] Foreign Application Priority Data

Jan. 14, 1975 France .................................. 75.00966

[51] Int. Cl.² ......................................... H01M 8/04
[52] U.S. Cl. ..................................................... 429/15
[58] Field of Search ............... 136/86 A, 86 R; 429/15

[56] References Cited

U.S. PATENT DOCUMENTS

| | | | |
|---|---|---|---|
| 3,711,333 | 1/1973 | Kohlmuller | 136/86 R |
| 3,758,342 | 9/1973 | Baba | 136/86 A |
| 3,902,918 | 9/1975 | Pompon | 136/86 A |

*Primary Examiner*—John H. Mack
*Assistant Examiner*—H. A. Feeley
*Attorney, Agent, or Firm*—Sughrue, Rothwell, Mion, Zinn and Macpeak

[57] ABSTRACT

Zinc-air electrochemical cell comprising several elements fed with an electrolytic solution comprising zinc powder in suspension, conveyed by forced flow in the said elements, those elements being grouped together in modules, electrically connected in series and fed by the said solution also in series within each of the said modules. Such a cell comprises one or several unitary cell blocks each comprising two substantially identical modules arranged one above the other and electrically connected together in parallel, the module situated at the upper level receiving the said electrolytic solution which, after it has crossed through that module, is transferred to the input of the upper element of the second module situated at the lower level and lastly, flows out through the output of its lower element.

8 Claims, 6 Drawing Figures

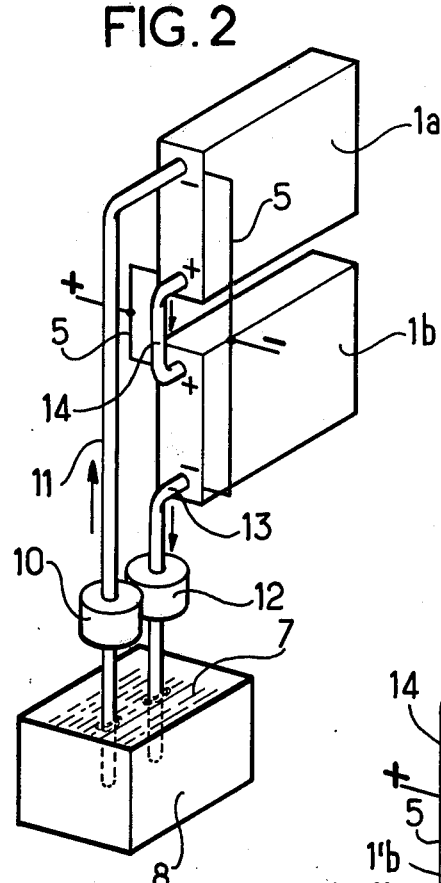
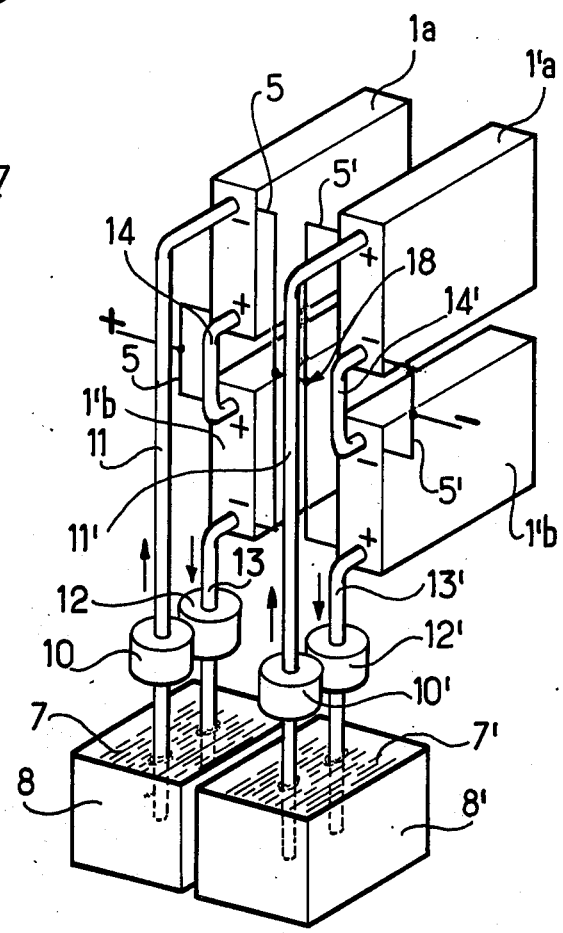

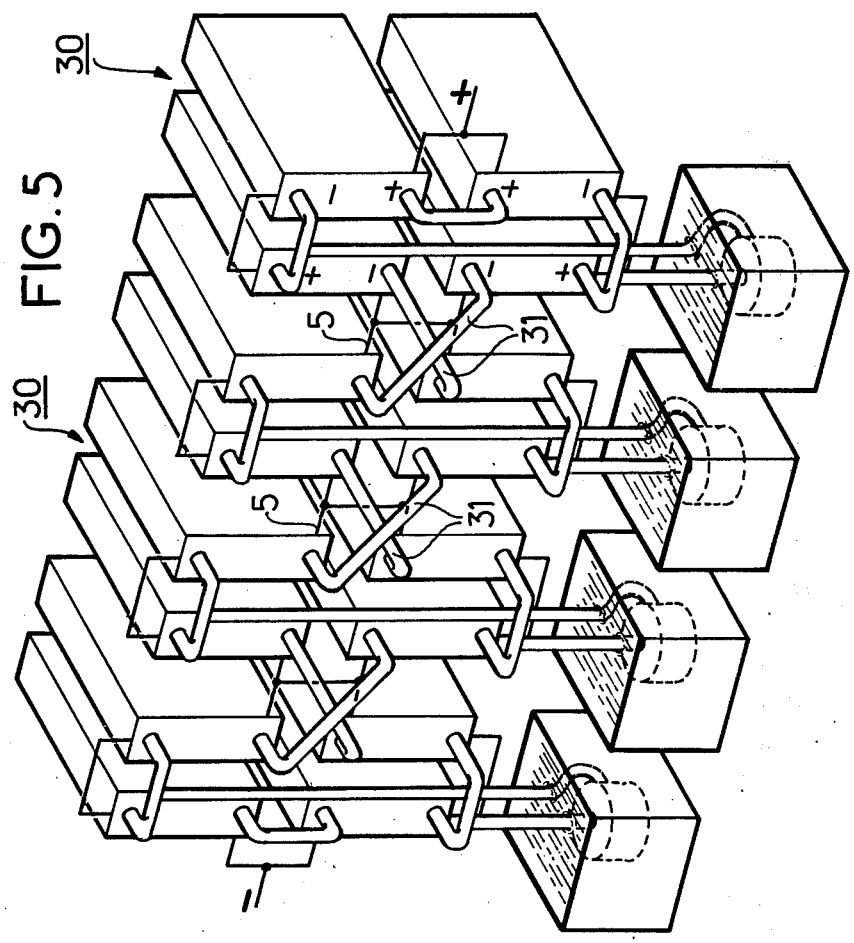
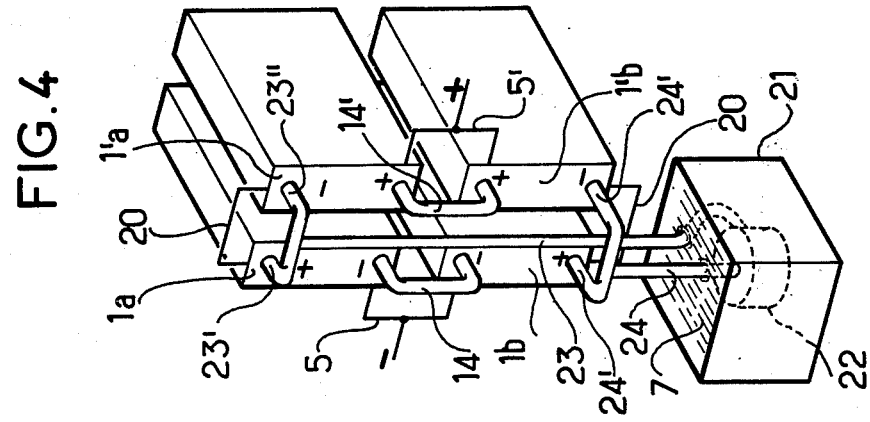

ZINC-AIR ELECTROCHEMICAL CELL

BACKGROUND OF THE INVENTION

The present invention relates to air-zinc electrochemical cells.

Electrochemical cells of such a type are well-known and are, at present, the object of numerous research operation with a view to equipping non-polluting vehicles.

It is stated for reference that an elementary cell or element of such a cell comprises a catalytic active part; and an alkaline solution containing zinc powder in suspension, conveyed by means of pumps, is made to flow in that elementary cell; the oxidation of the zinc and the consumption of the atmospheric oxygen generate an electromotive force.

With a veiw to constituting a cell, it us therefore necessary to couple electrically and hydraulically such elementary cells of elements together.

It is possible to consider the feeding of the elements in parallel with the solution, but in that case, it is observed that if the elements are coupled together in series, there appear loop currents which can cause disturbances in the operation of the cell.

Circumstances therefore lead to the feeding of the elements in series with the alkaline solution in the case where it is required to connect these same elements in electrical series.

In this way, sets of elements or modules each comprising a limited number of elements are formed and it is, of course, possible to couple such modules together with a view to producing a cell having predetermined rated electrical characteristics.

Nevertheless, the cells produced in this way have a certain number of disadvantages.

A first disadvantage results from the fact that, in such cells, the putting into circulation of the suspension of powder in the various elements requires the implementing of a great number of pumps and pipes, this increasing proportionally their cost price.

Another disadvantage results from the fact that on the stopping of the cell, there remains, in the elements, a certain quantity of alkaline solution and zinc powder. The result of this is an appreciable seeping, towards the outside, of the said alkaline solution through the porous electrodes and also the difficulty of replacing all the solution used by a regenerated solution.

SUMMARY OF THE INVENTION

The present invention makes it possible to overcome the major disadvantages outlined hereinabove and it has as its object an electrochemical air-zinc cell in which a minimum number of pumps and pipes are used and whose bulk for a given electrical power has, likewise, a minimum value.

Moreover, in such a cell, the draining of the alkaline solution containing the zinc powder in suspension is effected as soon as operation stops, this being immediate, complete and spontaneous.

The object of the invention is therefore an electrochemical cell of the type comprising several elements fed with an electrolyte solution comprising an active material in suspension and more particularly zinc powder, conveyed by forced flow in the said elements, those elements being grouped together into modules, electrically connected together in series and fed by the said solution, also in series, within each of the said modules, that electrochemical cell being characterized in that it includes at least one unitary cell block comprising two substantially identical modules arranged one above the other, electrically interconnected in parallel, the module situated at the upper level receiving the said electrolytic solution at the input of its upper element, that solution, after having passed through the said module situated at the upper level being transferred to the input of the upper element of the second module situated at the lower level and lastly flowing out from that second module after having passed through the latter through the output of its lower element.

BRIEF DESCRIPTION OF THE DRAWINGS

Other characteristics and the advantages of the invention will become apparent from the following description given by way of a purely illustrating example having no limiting character, with reference to the accompanying drawings and diagrams, in which:

FIG. 2 shows a unitary cell block according to the invention.

FIG. 3 shows a first embodiment of a cell group according to the invention.

FIG. 4 shows again another embodiment of a cell group according the invention.

FIG. 5 shows again an embodiment of an electrochemical cell according to the invention.

DESCRIPTION OF THE PREFERRED EMBODIMENT

Figure 1:
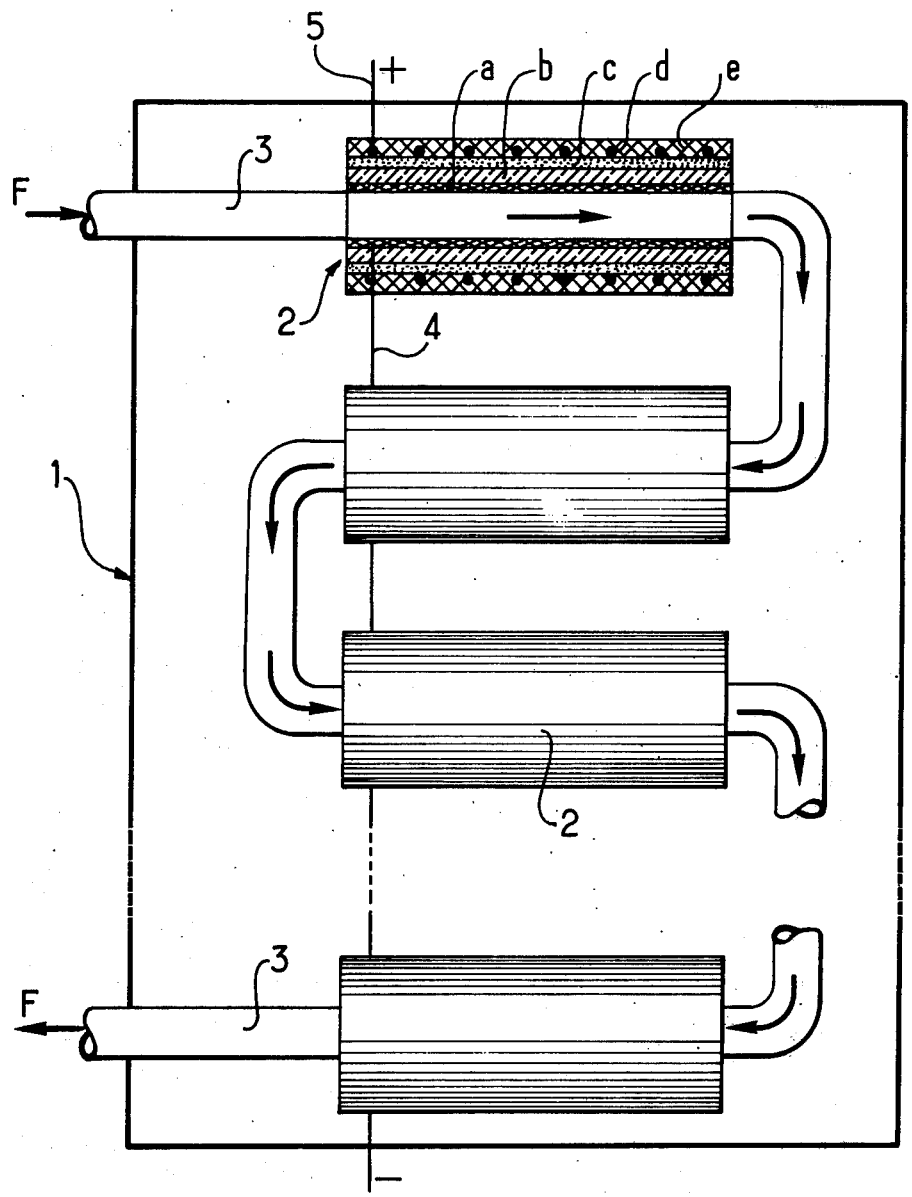
FIG. 1 specifies the structure of a module implemented in the method according to the invention.

FIG. 1 therefore illustrates a module 1 constituted by a certain number of elements 2 which are subtantially identical to one another, each supplying an electromotive force u and fed in series by a potassium hydroxide solution constaining zinc powder in suspension, such feeding being effected by means of pipes 3 and being materially shown by the arrows F.

Such elements are, for example, of the type described by the Applicant in his French patent application No. 71 45 734 of 20th Dec., 1971, as well as in the applications for French patent additions No. 72 229 61 of 26th June, 1972 and No. 73 147 65 of 24th Apr., 1973, for a "Forced flow electochemical cell".

It should be stated for reference, on that subject, that each of the said elements 2 comprises a negative collector grid $a$, a porous separator $b$, a porous active catalytic layer $c$, a positive collector grid $d$ coated with a water-repellent layer $e$. Therefore, the potassium hydroxide and zinc solution passes through those elements along their whole length in the manner shown. The oxidation of the zinc and the consuming of the oxygen in the outside atmosphere at the level of the catalytic layer $c$ generates an electromotive force between the grids $a$ and $d$. Of course, the elements shown are connected electrically in series by means of conductors 4, the electromotive force generated by such a module being collected at the terminals of the outside connections 5.

On this subject, it is stated for reference that, in French application No. 74 12 152 of 5th Apr., 1974, for a "Method and device for connecting forced flow electrochemical cell elements" the Applicant has disclosed the means for connecting the elements electrically in series while avoiding detrimental electric interference phenomena.

It will be observed, however, that the number of elements 2 in a module is limited subsequent to losses of charge generated in the said elements by the flux of solution.

Indeed, if the pressure of the solution at the input is designated as $po$ and the loss of charge in an element is designated as $\Delta p$, it will be seen that in the last element (in the case, the element at the bottom of FIG. 1), the pressure is $po - n (\Delta p)$, n being the number of elements of the module. Now, it is necessary for that pressure to remain between certain limits for a porous air electrode to operate correctly. It will therefore be understood that the value of n is limited by such a restriction.

However, it is stated for reference that, in French patent application No. 73 44 188 of 12th Dec., 1973, for a "Method and device for feeding elements of a forced flow electrochemical", the Applicant has disclosed the causes and the effects of that difficulty and has described a method and device for the flow of electrolyte enabling:

1. the putting in hydraulic series of a theoretically unlimited number of modules, and
2. the placing of the air electrodes of the elements in the optimum pressure conditions, while retaining the advantages of the method and device for electrically coupling in series mentioned hereinabove.

To great advantage, the flux of liquid enters through the upper element and leaves through the lower elements, such as shown in the figure. Indeed, if the overall height of the module is designated by h and the density of the solution is designated by $\rho$, the difference in the static pressure between the top and the bottom is therefore equal to h. The loss of charge being as previously stated $n (\Delta p)$, the resulting difference in pressure is $n (\Delta p) - \rho h$. Thus, the loss of charge $n (\Delta p)$ is partly compensated by the difference in static pressure $\rho h$, this being an advantage, for the number n of elements per module can be, in this way a little higher than if the reserve flow direction had been chosen.

To produce a cell, it is therefore necessary to couple such modules electrically and hydraulically.

Such electric coupling is, to great advantage, effected as described by the Applicant in his French patent application No. 73 43 591 of 6th Dec., 1973, for an "Electric safety coupling for a forced flow electrochemical cell".

It should be stated for reference that this application consequently concerns an electric safety coupling for an electrochemical cell, of the type comprising several elements fed in series with an electrolytic solution comprising an active material in suspension and more particularly zinc powder, the said solution being conveyed by forced flow in the said elements from a storage tank and made to flow back into the said tank after having passed through the last element, the said elements being grouped into modules and electrically connected in series within the said modules, the said modules themselves being fed in series with the said solution, the said cell being suitable for providing an electromotive force mU and a rated current I, the said modules themselves being grouped into p assemblies and connected electrically in series in each assembly, characterized in that the number p of assemblies is an even number and preferably equal to 2, the said assemblies each comprising the same number m of modules each suitable for providing an electromotive force U and rated I/p, those assemblies being, moreover, interconnected in parallel, so that the potential of the solution conveyed from the tank towards the first element of the cell be equal to the potential of the solution flowing out of the last element of the said cell and made to flow back into the said tank.

According to the present invention, and with reference to FIG. 2, a unitary generator block has been illustrated.

For that purpose, two modules 1A and 1B, which are substantially identical, each providing an electromotive force U and a rated current I/2 are implemented. Those modules are electrically connected in parallel through their output connections 5. Such an embodiment corresponds to the case where $m = 1$ and $p = 2$, m and p being such as defined hereinabove.

Such as illustrated, these two modules are arranged one above the other and fed with an alkaline solution 7 enclosed in a tank 8.

Such supplying is effected by means of a first pump 10 compensating the difference in static pressure $\rho h$ and conveying the said solution from the tank 8 to the input of the upper element of the module 1A, the being effected by means of the pipe 11, whereas a second pump 12 makes the solution 7 flow back through the pipe 13 into the tank 8 after it has passed through the two modules, that second pump compensating the difference $(2n (\Delta p) - \rho h)$.

Morover, the pipe 14 ensures the flow of the solution 7 from the module 1A towards the module 1B such as illustrated in FIG. 2.

It will therefore be seen that such an arrangement according to the invention makes it possible to avoid the use of an intermediate pump between the modules 1A and 1B, suitable for compensating the loss of charge $n (\Delta p)$ in the module 1A.

Moreover, and in compliance with the description made in French patent application No. 73 43 591, of 6th Dec., 1973, the solution 7 flowing out through the pipe 13 of the module 1B is brought to the same potential as the solution flowing out through the pipe 10 to feed module 1. It will therefore be seen that within the tank 8, all of the solution 7 is at the same potential, this making it possible to avoid the disadvantages previously mentioned in the said application.

In other words, the alkaline solution 7 is conveyed into the modules 1A and 1B so that its potential which increase within the module 1A be subsequently decreased within the module 1B to recover its original value.

FIG. 3 shows a first embodiment of a cell group according to the invention obtained by grouping together two unitary cell blocks identical to the one previously described with reference to FIG. 2. More precisely FIG. 3 shows that another identical block comprising the same elements referenced by the same reference numerals but to which the "prime" index has been assigned, has been added to the unitary cell block described in FIG. 2.

These unitary cell blocks are electrically connected up in series by means of the connection 18.

In such a cell group, it is observed that the solution conveyed in the pipes 11, 11', 13 and 13' is at the same potential, namely, U, such a cell group sending out a voltage 2U.

It is therefore logical to provide for the hydraulic feeding of such a cell group exclusively by means of a tank and of two pumps and two pipes such as illustrated in FIG. 4.

FIG. 4 therefore shows the two unitary cell blocks, hence the modules 1A, 1'A, 1B and 1'B, such as previously illustrated, constituting an embodiment which provides a great advantage, of a cell group according to the invention.

From the electrical point of view, the modules 1A and 1B on the one hand and 1'A and 1'B, on the other hand, are connected up in parallel by means of the connections 5, 5' and the two unitary cell blocks connected up in series by means, moreover, of the end connections 20, the voltage of the cell group being supplied between the connections 5, 5'.

From the hydraulic point of view, the alkaline solution 7 containing zinc powder in suspension and contained in a single tank 21 is conveyed by means of a single pump 22 and through a single pipe 23, whose end is subdivided into two branches 23' and 23" towards the upper inputs of the modules 1A and 1'A respectively.

The said pump 22 is suitable for compensating simultaneously the difference in static pressure and the loss of charge in the modules.

At the lower output of the modules 1B and 1'B, the said solution runs through the two branches 24' which join together in one pipe 24 making solution flow back into the tank 21. As in the preceding case, the input potential of the electrolyte in the modules 1A and 1'A is the same as that of the output of the modules 1B and 1'B.

It is also possible, without going beyond the scope of the invention, to connect together cell groups such as described with reference to FIG. 4, as illustrated in FIG. 5.

According to FIG. 5, the cell groups 4 having no limiting character, generally referenced by numeral 30 and such as previously described are connected together in electrical series through their connections 5 to form an electrochemical cell.

From the hydraulic point of view, such supplying is effected as previously stated, but crossing the flux of solution between two neighbouring cell groups, hence implementing pipes such as 31 between the modules.

More precisely, the said electrolytic solution is, in each cell group, transferred after having passed through modules arranged at the upper level at the input of the lower adjacent modules of the unitary cell blocks of the two cell groups arranged on either side, whereas the modules of the said cell group arranged at the lower level receive the electrolytic solution coming from the upper adjacent module of the unitary cell blocks of the two cell groups arranged on either side as illustrated in FIG. 5.

It will be observed that such a crossing of the fluxes of the electrolytic solution is made possible by the fact that the said solution does not undergo any variation in potential on passing from one cell group to the other, nor any substantial variation in pressure.

Figure 6:
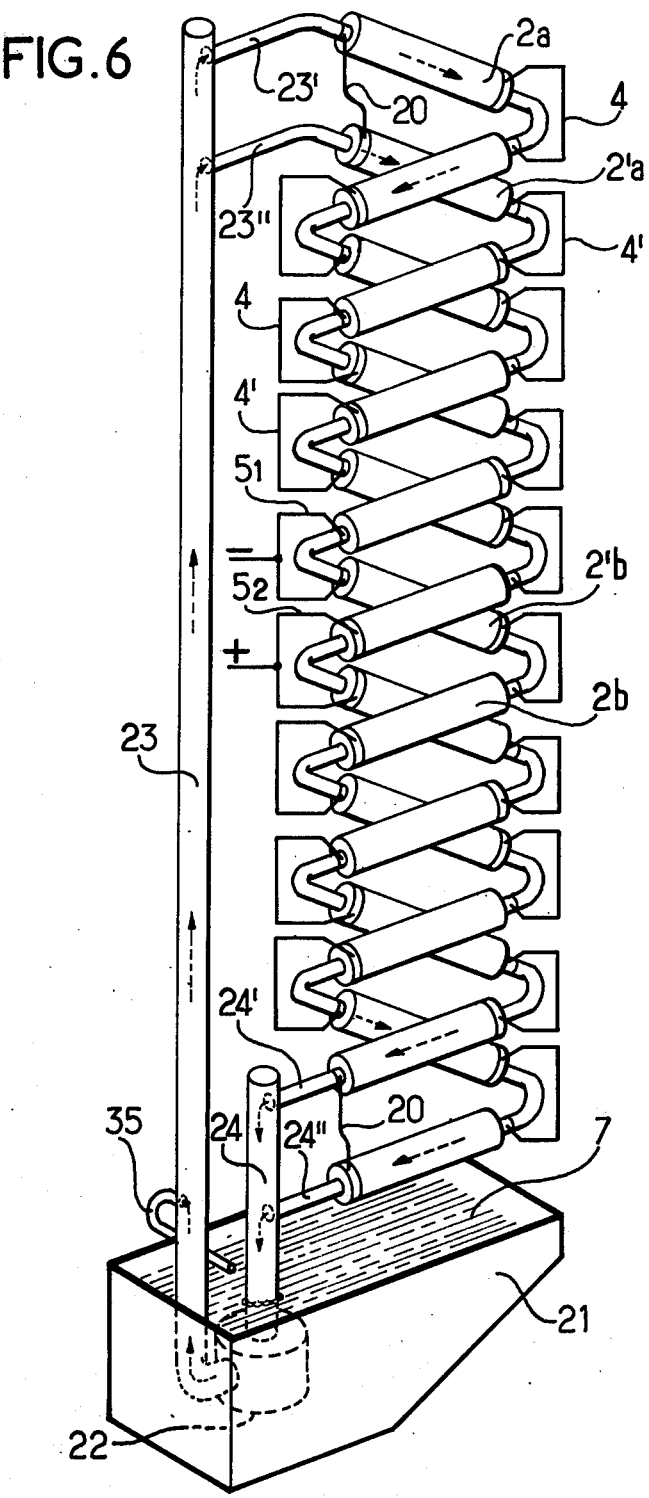
FIG. 6 shows an arrangement of the element of a generator group according to the invention which affords a great advantage.

In this way, a better uniformity of distribution of the alkaline solution in the cell groups 30 and a balanced operation of these latter from the electrical point of view are obtained. FIG. 6 illustrates an arrangement which is a particular advantage, for the elements such as 2 (FIG. 1), constituting the modules of a generator group, for example, having no limiting character, the elements of the modules 1A and 1'A, 1B and 1'B, constituting the generator group described with reference to FIG. 4.

Such an arrangement makes it possible to ensure on the one hand an immediate and complete draining of the alkaline solution from the elements, as soon as the operation of the cell stops, moreover without any increase in bulk.

For that purpose, as illustrated in FIG. 6, a cell group such as that shown in FIG. 4 has the following configuration:

The elements 2A constituting the module 1A and the elements 2B constituting the module 1B are hydraulically connected up in series and electrically connected up in parallel (connection $5_1$) and are, moreover, inclined with respect to the horizontal.

The elements 2'A forming the module 1'A and the elements 2'B forming the module 1'B are likewise connected hydraulically and electrically in parallel (connection $5_2$) and, moreover, inclined with respect to the horizontal, but in the opposite direction to the preceding elements.

Moreover, the said elements 2A and 2B, on the one hand and 2'A and 2'B on the other hand, are interwoven as shown in the figure.

FIG. 6 also shows the pump 22 conveying the solution 7 from the tank 21 through the pipes 23, 23' and 23", as well as the pipes 24, 24', 24" making the said solution 7 flow back into the tank after it has passed through the generator group.

The electrical connections 20 between the modules 1A and 1'A on the one hand and 1B and 1'B on the other hand, have been shown, as have the intermediate connections 5 (FIG. 4) referenced, in that case, $5_1$ and $5_2$ as previously stated.

It will be observed, moreover, that with a view to making draining easier, a pipe 35 having a small diameter is provided on the pipe 23 in the vicinity of the pump 22. That pipe, whose orifice is arranged above the level of the solution 7, discharges a small quantity of solution during operation periods. On the other hand, as soon as the operation of the pump 22 stops, the pump is filled with air and thus ensures the complete draining of the elements of the modules forming the cell group.

It must be understood that the invention is in no way limited to the embodiments described and illustrated, which have been given only by way of an example. More particularity, without going beyond the scope of the invention, details can be modified, certain arrangements can be changed or certain means can be replaced by equivalent means.

I claim:

1. An electrochemical cell of the type comprising several elements fed with an electrolyte solution comprising an active material in suspension and more particularly zinc powder, conveyed by forced flow in the said elements, those elements being grouped together into modules and electrically connected together in series and fed said solution in series within each of the said modules, said electrochemical cell including at least one unitary cell block comprising two substantially identical modules arranged one above the other, electrically interconnected in parallel the module situated at the upper level receiving said electrolytic solution at the input of its upper element, said solution after having passed through the said module situated at the upper level being transferred to the input of the upper element of the second module situated at the lower level and lastly flowing out from that second module after having passed through the latter through the output of its lower element.

2. A cell according to claim 1, wherein it forms a unitary cell block and further comprising a tank and first and second pumps, said electrolytic solution being conveyed from said tank towards said module situated at the upper level by means of said first pump suitable compensating for the difference in static pressure of said solution and made to flow back into said tank after having passed through the said module situated at the lower level by means of said second pump suitable compensating for the difference between the loss of charge in the modules and the difference in static pressure.

3. A cell according to claim 1, wherein it comprises a cell group formed by two unitary cell blocks electrically connected together in series and further comprising a tank and first and second pumps, said electrolytic solution being, in each unitary cell block, conveyed from said tank towards the said module situated at the upper level by means of said first pump suitable for compensating for the difference in static pressure of the said solution and made to flow back into said tank after it has passed through the said module situated at the lower level by means of said second pump suitable for compensating for the difference between the loss of charge in the modules and the said difference in static pressure.

4. A cell according to claim 1, wherein it comprises a cell group formed by two unitary cell blocks electrically connected together in series and further comprising a single tank and a single pump, the said electrolytic solution being conveyed from said single tank towards the modules situated at the upper level and made to flow back into the said tank after having passed through the modules by means of said single pump suitable for compensating simultaneously for the difference in static pressure of the solution and the loss of charge in the modules.

5. A cell according to claim 4, wherein it comprises at least two cell groups electrically connected together in series, the said electrical solution being, in each cell group, transferred after it has passed through modules arranged at the upper level at the input of the adjacent lower modules of the unitary cell blocks of the two cell groups arranged on either side, whereas the modules of the said cell group arranged at the lower level receive the electrolytic solution coming from the adjacent upper modules of the said unitary cell blocks of the two said cell groups arranged on either side.

6. A cell according to claim 1, wherein in each cell group, the elements of the two unitary cell blocks are intertwined and inclined with respect to the horizontal.

7. A cell according to claim 1, wherein the input potential of the electrolytic solution in the cell is equal to its output potential.

8. A cell according to claim 1, wherein the pipe conveying the said electrolytic solution from the tank comprises, in the vicinity of said pump, a pipe whose flow orifice is arranged above the level of the said electrolytic solution.

* * * * *